United States Patent [19]

Bores

[11] Patent Number: 4,834,578
[45] Date of Patent: May 30, 1989

[54] ENERGY-DISSIPATING OVERFLOW-TYPE PROTECTION SYSTEM ON DIKES AND/OR JETTIES

[76] Inventor: Pedro S. Bores, Vegafria, 1 T.1, Madrid, Spain, 28035

[21] Appl. No.: 861,139

[22] Filed: May 8, 1986

Related U.S. Application Data

[63] Continuation-in-part of Ser. No. 786,840, Oct. 11, 1985, abandoned.

[30] Foreign Application Priority Data

May 31, 1985 [ES] Spain ............................ 543.747

[51] Int. Cl.$^4$ ............................................. E02B 3/06
[52] U.S. Cl. ......................................... 405/30; 405/21; 405/25; 405/34
[58] Field of Search ................ 405/15, 21, 23, 25, 405/30, 31, 33, 35, 26, 27, 34

[56] References Cited

U.S. PATENT DOCUMENTS

| | | | |
|---|---|---|---|
| 1,489,428 | 4/1924 | Cushing | 405/21 |
| 2,309,022 | 1/1943 | Streefkerk | 405/21 |
| 3,386,250 | 6/1968 | Katayama | 405/33 |
| 3,415,061 | 12/1968 | Staempfli | 405/34 |
| 3,995,434 | 12/1976 | Kato et al. | 405/23 |
| 4,064,700 | 12/1977 | Sameshima | 405/30 |
| 4,225,268 | 9/1980 | Treu | 405/27 |
| 4,406,564 | 9/1983 | Hanson | 405/26 |
| 4,407,608 | 10/1983 | Hubbard | 405/25 |
| 4,502,816 | 3/1985 | Creter, Jr. et al. | 405/21 |

FOREIGN PATENT DOCUMENTS

| | | | |
|---|---|---|---|
| 2341845 | 3/1975 | Fed. Rep. of Germany | 405/31 |
| 2809892 | 12/1978 | Fed. Rep. of Germany | 405/30 |
| 0002117 | 1/1980 | Japan | 405/21 |
| 0003309 | 1/1985 | Japan | 405/21 |

Primary Examiner—Randolph A. Reese
Assistant Examiner—John A. Ricci
Attorney, Agent, or Firm—Amster, Rothstein & Ebenstein

[57] ABSTRACT

An energy-dissipating overflow-type dike dividing a body of water into inner and outer zones, comprises an overflow-type dike defining on its upper surface a platform having an average elevation approximating the mean surface of the body of water. A plurality of upstanding wave energy-dissipating elements, each of varying horizontal cross-sectional width, are disposed in spaced relationship on the platform to reduce the potential impact effect of a water overflow on the inner zone by extending the area and period of impact. A plurality of channels, each of varying horizontal cross-sectional width, are defined by and between the elements for dissipating the kinetic energy of water passing therethrough while enabling water flow for basin water renewal in the inner zone.

5 Claims, 16 Drawing Sheets

PRIOR ART FIG.8

ENERGY-DISSIPATING OVERFLOW-TYPE PROTECTION SYSTEM ON DIKES AND/OR JETTIES

CROSS-REFERENCES TO RELATED APPLICATIONS

The present application is a continuation-in-part of U.S. Ser. No. 786,840, filed Oct. 11, 1985, now abandoned.

This invention covers an energy-dissipating overflow-type protection system for dikes (jetties) which, with its smaller dimensions and when equipped per the invention, assists and improves conventional systems in various ways. This system is designed with a crest elevation close to that of mean sea level, this level being exceeded or not, depending on the percentage of energy that one wishes to dissipate and on the shoreline dynamics, as well as on the function of the structure and the morphological, landscape and environmental characteristics of the site. The system consists of a platform, the upper part of which is intended to act as a dissipator of energy, dispersing the mass of liquid overflow and throwing it into the air, thereby extending the area of impact and lengthening the time of impact of the liquid overflow mass on the projected area. This platform consists of a crest on the dike (jetty), whether it be of the vertical or breakwater type.

Existing protection systems were designed as systems to create beaches or sheltered areas for various purposes: defense (naval bases, etc.), transport (commercial ports, hydroplane bases, etc.), production (of energy, power plants, food (fish factories), minerals (extraction of oil, coal, etc.)), recreation (ports and water sports facilities, pools, etc.), etc., by preventing the direct action of waves and/or other short-acting serious sea movements (wakes, etc.).

The implementation of conventional protection systems was based on the installation of dikes (jetties) with vertical or nearly-vertical surfaces (known as vertical jetties) made of pre-fabricated elements or elements constructed "in situ", or of slope-type jetties (known as breakwater jetties) built with natural or artificial stone and forming a more or less sloping wall. Both systems are classified into non-overflow and overflow types.

The basic disadvantage of the former types was their excessive height, since the crest of the jetty or its barrier had to be at such an elevation that it prevented the overflow of the probable mean wave of the maximum stormy weather period of the mean eleven-year hypercycle, which presumed crest heights sometimes of several tens of meters: San Ciprian—(Lugo), 22 meters, Bilboa 21.5 meters, Gijón, 18 meters, Valencia, 16.2 meters (according to design).

With such crest elevations, the non-overflow jetties or dikes, both vertical and breakwater type, created real visual barriers cutting off views of the sea, even from rather tall buildings, which represented a serious disadvantage when there is an urban coastal facade, as is usually the case in many commercial ports and in nearly all recreational ports, beaches, etc.

Air circulation was also interrupted by the non-overflow dike (jetty), which was a very major disadvantage in the case of small protected areas, as is the case with recreational ports, protected beaches, shore-side pools and other sports or recreational facilities, because a real "well effect" was created, greatly heating the air in the sheltered zone and creating other inconveniences.

Overflow-type dikes (jetties) permitted the highest waves to pass over them, their crown elevation being about half as high as that of the non-overflow type dikes or jetties. This reduction, which was not sufficient to prevent the visual barrier effect nor to eliminate the "well effect", did permit the relatively frequent passage of overflow volumes whose sudden and concentrated impact on the protected area produced very short-lived percussion waves, a serious inconvenience for small vessels: fishing boats, recreational craft, etc. At the same time, in conventional overflow dikes (jetties), the main stratum on the protected side, subjected to a flow of descending water, is in a very precarious situation as to stability, unless the crest protection and/or the width of the crest itself are largely dimensioned, with the corresponding disadvantage of space and budgetary requirements.

The purpose of this invention is manifold, because by providing a technical solution for the dissipation of energy, it is possible to conceive and design the system, both in terms of its structure and its equipment, permitting adequate treatment of urban coastal systems and integrated design of ocean fronts. Finally, it gives these energy-dissipating overflow-type protection systems functionality with adequate morphology. Though they can be used in any circumstances, the specific field of application of these systems is on large bodies of water—seas, lakes, etc., with long-term level variations—tides, among other things—of reduced magnitude. The western Mediterranean coasts, among others.

Among other advantages, some very concrete ones are indicated below, and make it possible to evaluate the interest and clear novelty of this invention, particularly indicated for optimum tourist utilization of our shores.

Since the dikes (jetties) according to this invention can be overflowed by all waves of a certain height, the stability of these systems, whether vertical or breakwater type, is greater than that of conventional systems. In breakwaters, because the equilibrium of the edges is always toward the top, and in vertical jetties because the bulk of the pressure diagram disappears. This, combined with the smaller dimensions of the dikes (jetties) according to the invention and the smaller area they occupy, represents a major advantage not only in terms of space but also in terms of economics, over conventional systems.

On beaches and in urban areas, particularly in tourist areas, the use of conventional dikes (jetties), whether vertical or breakwater type, with crest heights that generally exceed eight meters. Sometimes reaching twenty meters, creates "visual screens" that block views of the sea, which are so much appreciated both by the coast residents and by visitors. With the energy-dissipating protection system according to this invention, the formation of "visual screens" is avoided, due to the insignificant, and in certain cases non-existent, crest height of the platforms and energy dissipators above sea level.

In conventional protection systems intended to form and/or shelter beaches and create basins, particularly if the latter are of small size, the great crest height of conventional protection systems, breakwater or vertical dikes (jetties), causes a "well effect" by preventing or at least creating an obstacle to the circulation of air. This problem is solved in the invention by permitting the free circulation of air over the immediate sea level surfaces.

The protected basins formed using conventional protection systems maintain a nearly permanent water level on coastlines with minimal tides. The lack or renewal of the basin water creates problems of silt sedimentation, accumulations of floating elements and the creation of anaerobic conditions, which are totally undesirable both in port basins, etc., and on protected beaches. Using the invention, one achieves a permanent renewal of the water in the protected area by designing the energy-dissipating overflow system in such a way that one part of it can preferably be overflowed for any sea condition, thereby allowing for a continuous flow that will guarantee reoxidation of the waters and avoid deposits and the accumulation of undesirable floating elements.

An additional major advantage of the invention over conventional protection systems is the possibility that the crest can be occupied by swimmers and other potential users, because it is at a low height above sea level, not steep as in the case of conventional systems, but appropriate in terms of shape and height as a pool edge, a dock for small boats, etc., which substantially increases the useful area of the waterside, without any need for occupants of the energy-dissipating overflow system to be exposed to grave danger, since in the unlikely event of a wave that would be out of the ordinary for sea conditions prevailing during the season when access to the protection system is permitted, does overflow the structure, the users, given the morphology of the system covered by this patent, are not in danger of being trapped or caught in the structure, as would happen in conventional protection systems. The low height of the crest of energy-dissipating overflow systems also means that is users fall into the protected basin, there is no more danger than in a dive from the edge of a pool.

In structures of great esthetic, landscape design and/or ecological responsibility, the energy-dissipating overflow-type protection systems covered by this invention can adopt any appropriate morphology, forming highly varied geometric and/or environmental compositions, even simulating nature's own forms and compositions, such as dune fields (linear or in barchans), reefs, granite domes, etc., the platform and/or energy dissipators being designed with appropriate arrangement and morphology. This important advantage is especially outstanding in energy-dissipating protection systems intended to create or to stabilize beaches and/or to protect coasts and/or installations.

The following figures show some examples of conventional protection systems, dikes (jetties), in contrast with the energy-dissipating overflow-type system according to this invention.

FIGS. (1), (2) and (3) show the typical morphology and gigantic dimensions of the riprap dikes (jetties) at San Ciprian (Lugo), Bilbao and Valencia, the first-named built of boulders and the latter two with parallelipipedic blocks. All three are designed not to be overflowed.

FIGS. (1), (2) and (3), the figures represent elevations above the level marked as 1, which is assigned the value of +0.00 and represents the B.M.V.E. level (Eqinocial Low Tide Level). Number 2 indicates the P.M.V.E. level (Equinocial High Tide Level). Other numbers represent elevation marks of distances in meters.

Figure 1:
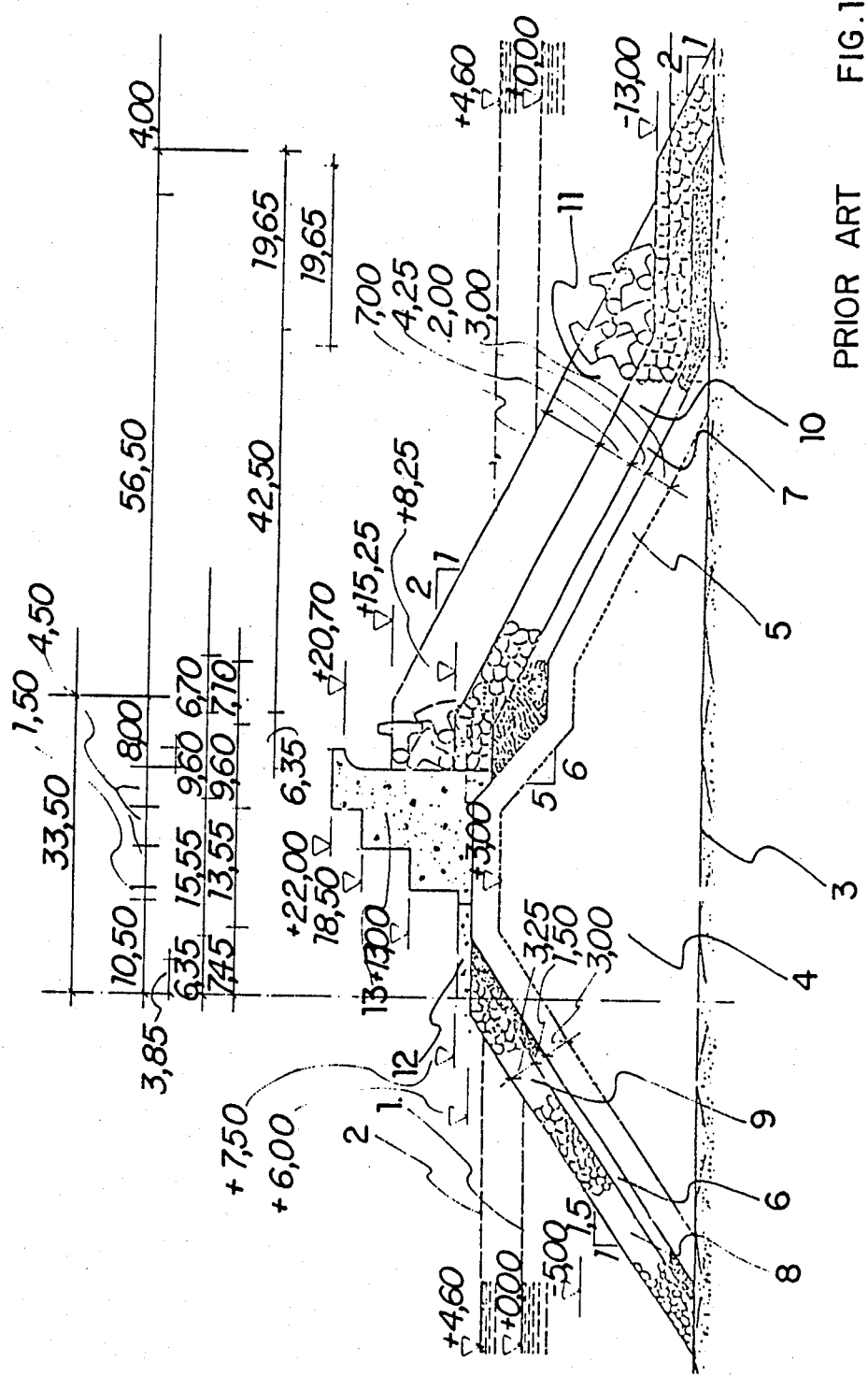
FIGS. 1-8 are side elevational views, partially in cross section, of prior art dikes, ripraps, and jetties, and the environment in which each may be found.

FIG. 1, 3 represents the natural terrain, 4 the core, 5 the entire classified one, 6 riprap between 0.3 and 0.5 t, 7 riprap from 0.5 to 1.0 t, 8 riprap from 1.0 to 3.0 t, 9 riprap from 3.0 to 5.0 t., 10 riprap over 7.0 t., 11 50-ton boulders, 12 a concrete slab and 13 the concrete shoulder.

Figure 2:
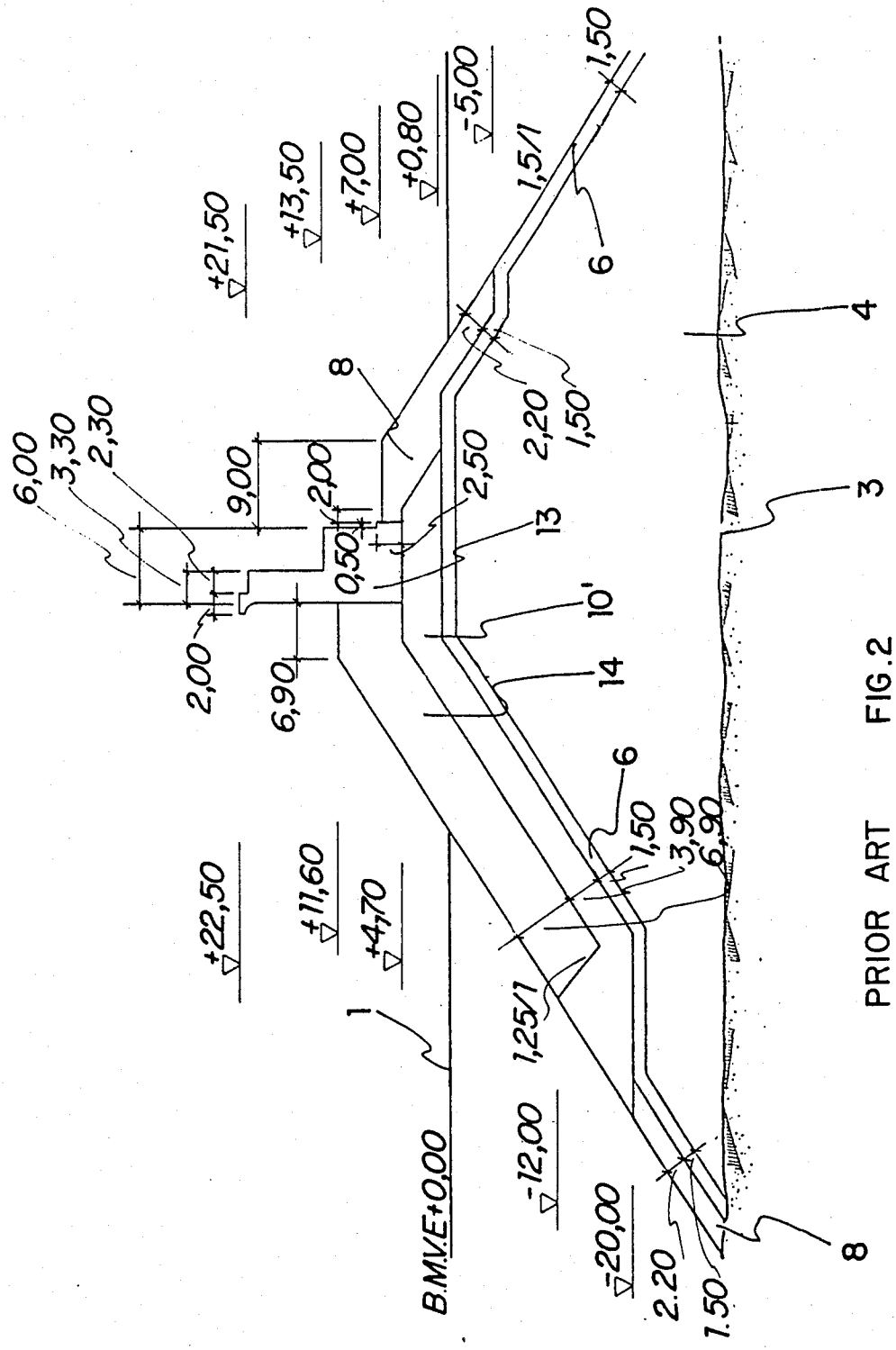

In FIG. 2, the same designations are used as above, plus the following: 10' designates 6.0 t riprap, 14 85.0 t blocks.

Figure 3:
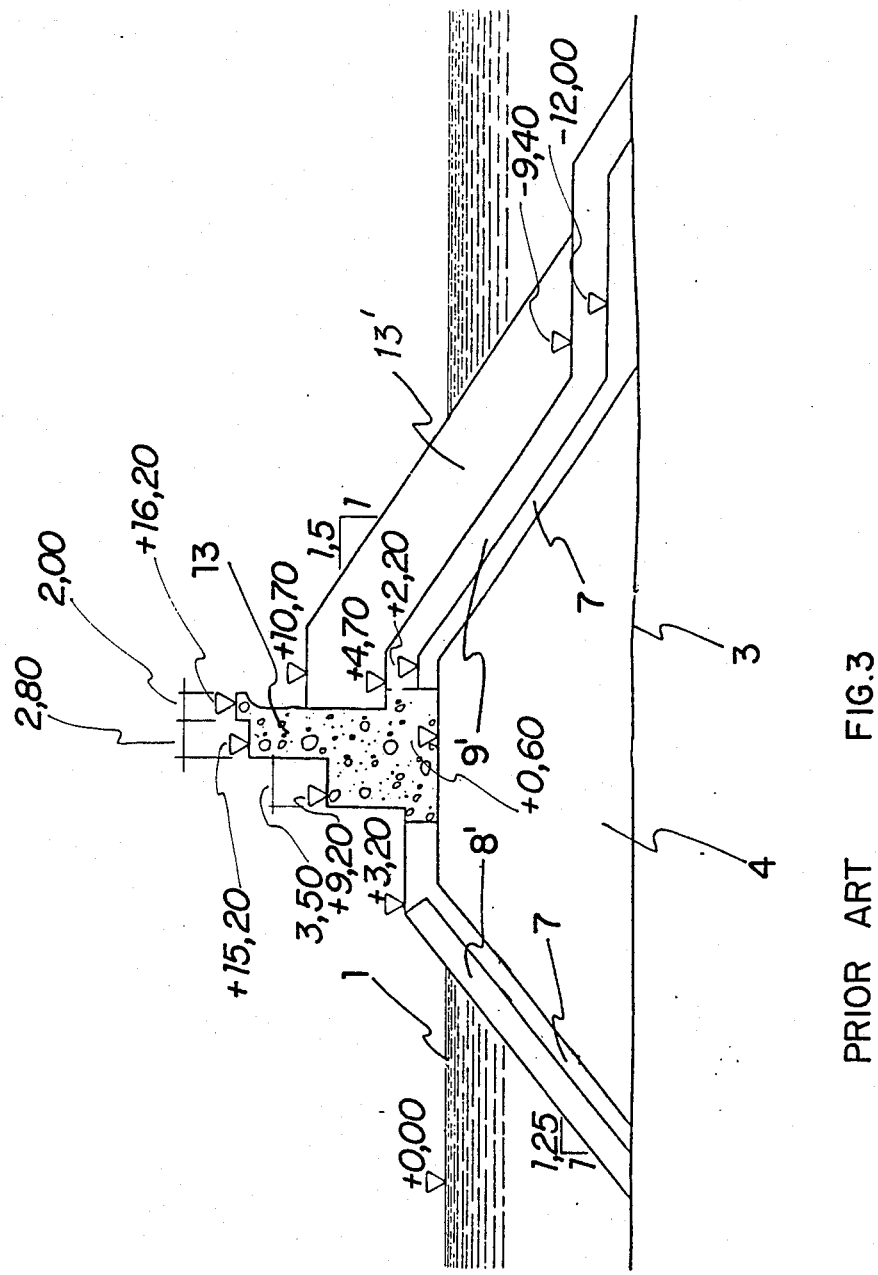
Figure 4:
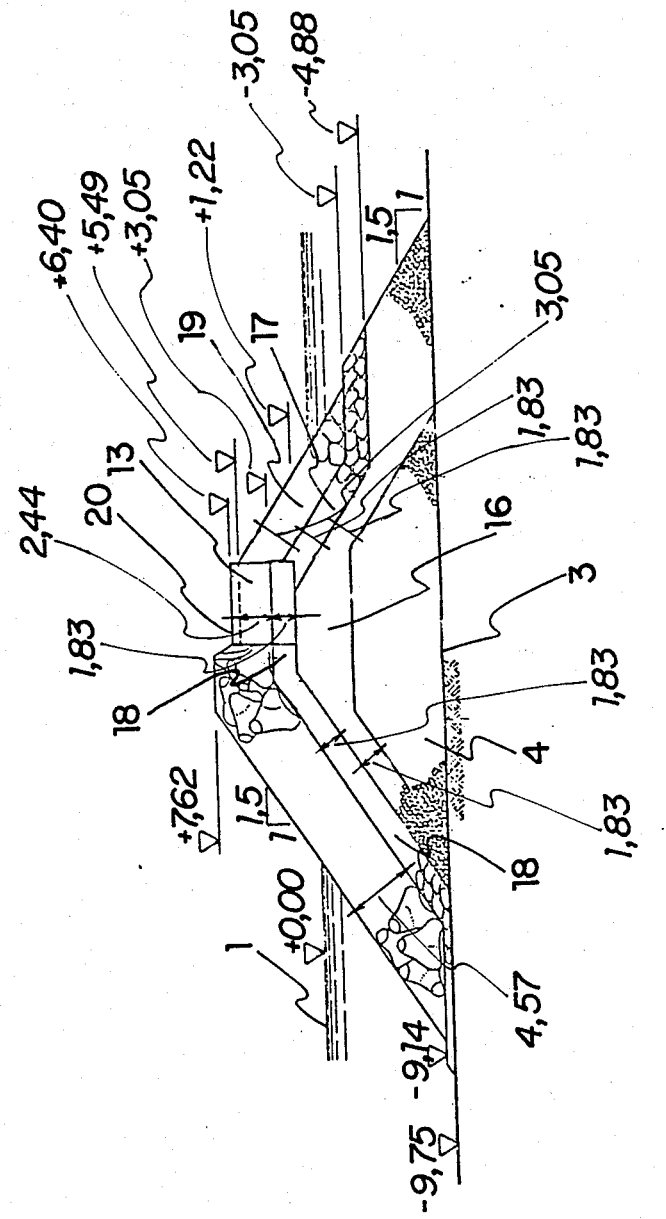

FIG. 3 uses the same designations as above, plus the following: 8' designates 2.0 t riprap, 9' 4.0 t riprap, 13' 70.0 t blocks.

FIGS. (4) and (5) are cross-sections of the overflow riprap dikes (jetties) at Crescent City (United States of America) and Port Talbot (United Kingdom). Note the protection of the crest and of the lee side stratum. At Port Talbot (5), the weight of the boulders of the stratum on the lee side is 4–6 tons, while on the sea side it is 6–8 tons, figures that are only slightly higher than those for the lee side. This is despite the fact that the crest elevations in both cases are relatively high, and that, in other words, these dikes are only partially overflowable.

Figure 6:
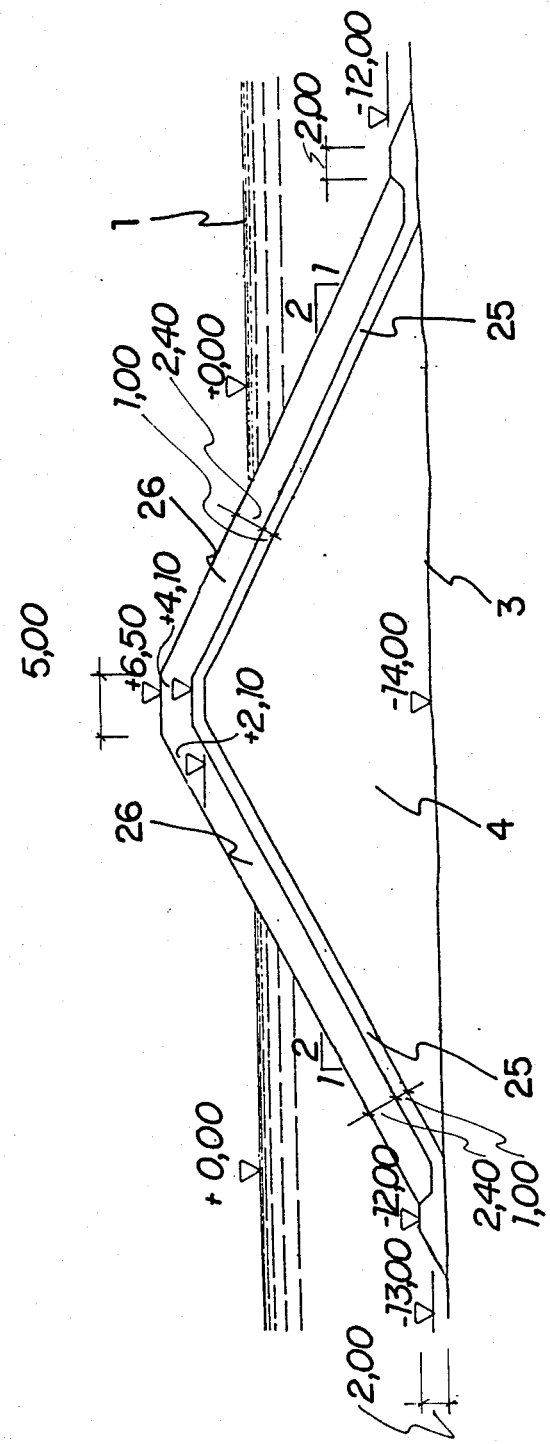

A particularly notable case in this connection is the port of Bandar Abbas (Iran), which is nearly non-overflowable, with the same boulder weight in both strata, on the sea side and on the lee side (FIG. 6).

FIGS. (7) and (8) are cross-sections of the vertical dikes (jetties) at Naples, built in 1929, and at Santa Cruz de Tenerife, built in 1980. Designed not to be overflowed, their crest elevation is moderate because in both cases, the coasts have moderate wave action.

FIGS. 4, 5, 6, 7, 8 and 9 use the same designations as in the earlier cases, in addtion to the following designations: 16 represents 0.045 to 1.0 t riprap, 17 represents 0.45 to 0.90 t riprap, 18 represents 2 to 3 t riprap, 19 represents riprap of an average of 12.0 t, with a minimum of 7.0 t, 20 represents a concrete platform.

Figure 5:
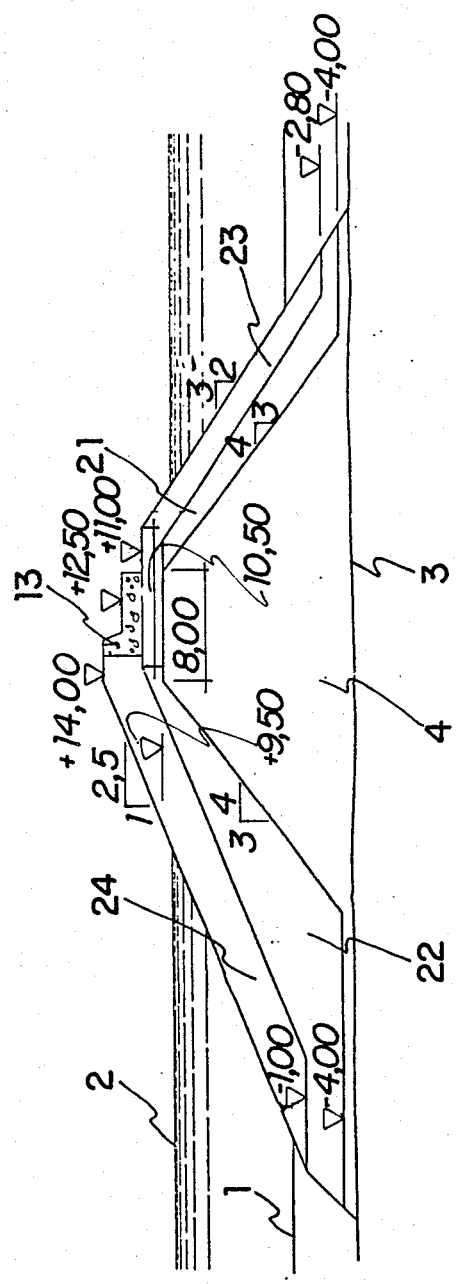

In FIG. 5, 21 represents riprap of 2 to 4 t, 22 represents riprap of 3 to 6 t, 23 represents riprap of 4 to 6 t, 24 represents riprap of 6 to 8 t.

In FIG. 6, 25 represents riprap of 0.2 to 0.8 t, riprap of 3.0 to 4.0 t.

Figure 7:
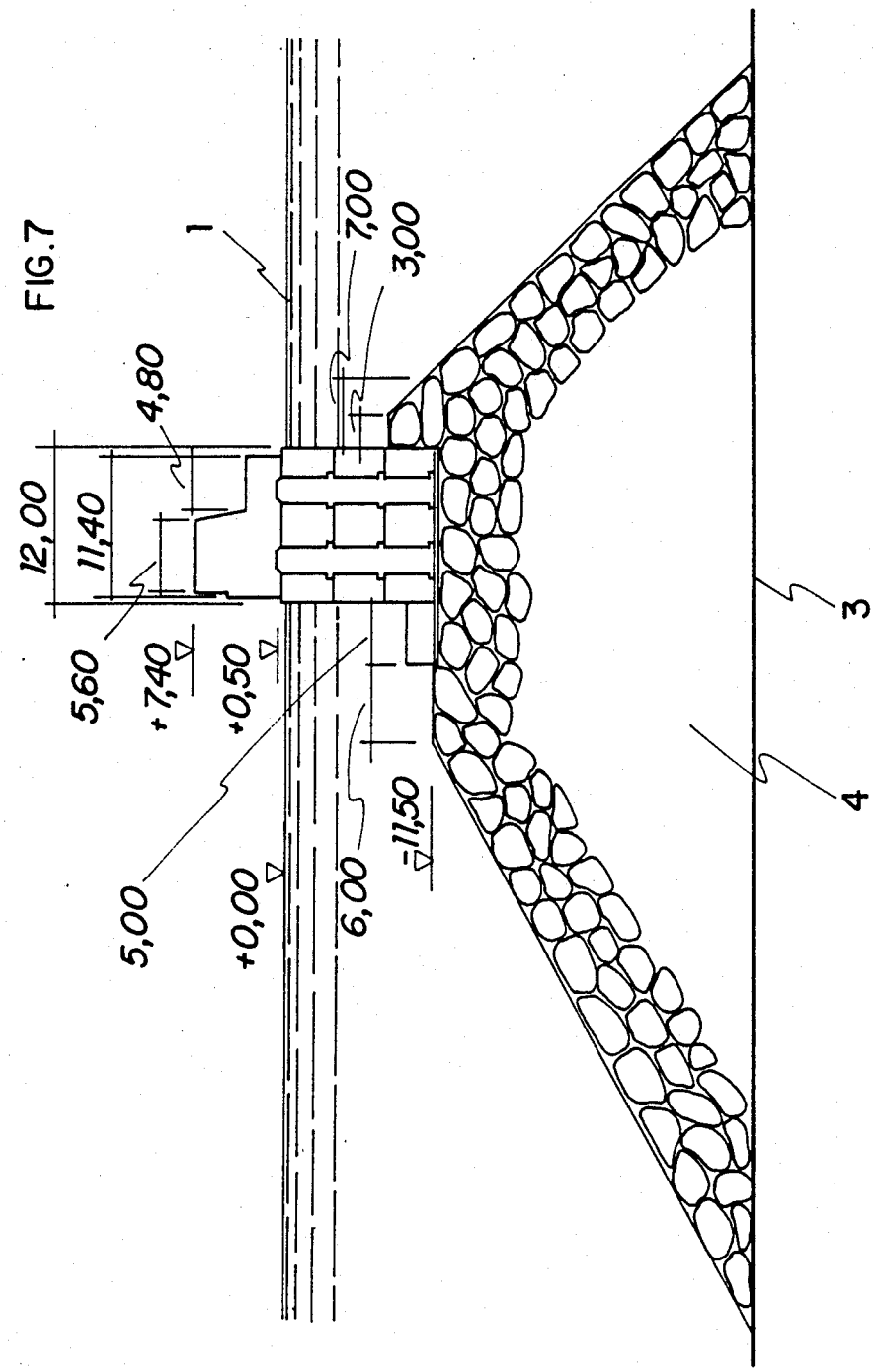

FIG. 7 shows the Naples jetty, built of cellular blocks.

Figure 8:
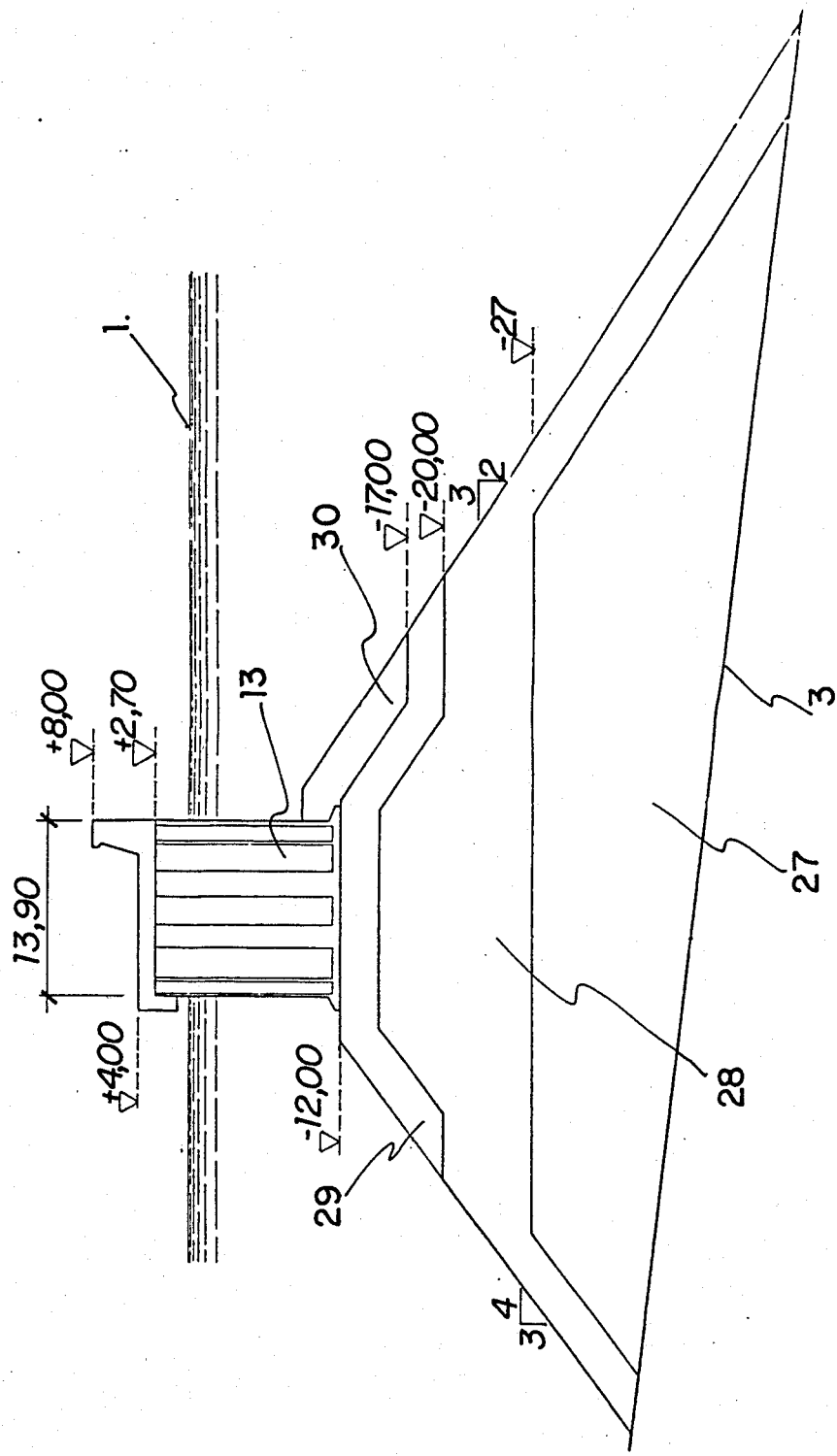

FIG. 8 shows the jetty at Santa Cruz de Tenerife, which has floating caissons over a bed of riprap, where 27 represents riprap $\leq$25 Kg, 28 represents riprap of 25 to 250 Kg, 29 riprap between 0.25 and 2.0 t, 30 riprap of 2.0 to 4.0 t.

FIGS. (9) and the following show various alternative energy-dissipating overflow-type systems in accordance with this invention. These can be built in segments with the following forms of revolution: cones, conoids (FIGS. 9, 10, 11), truncated cones, truncated conoids, cylinders, cylinderoids, etc.—with circular, elliptical or other type of directrix and straight, curved or mixed generatrixes. They can also be made with prismatic, prismoidal (12) or pyramidal (13) segments, with flat, warped, graded, segmented, etc., faces.

Figure 9:
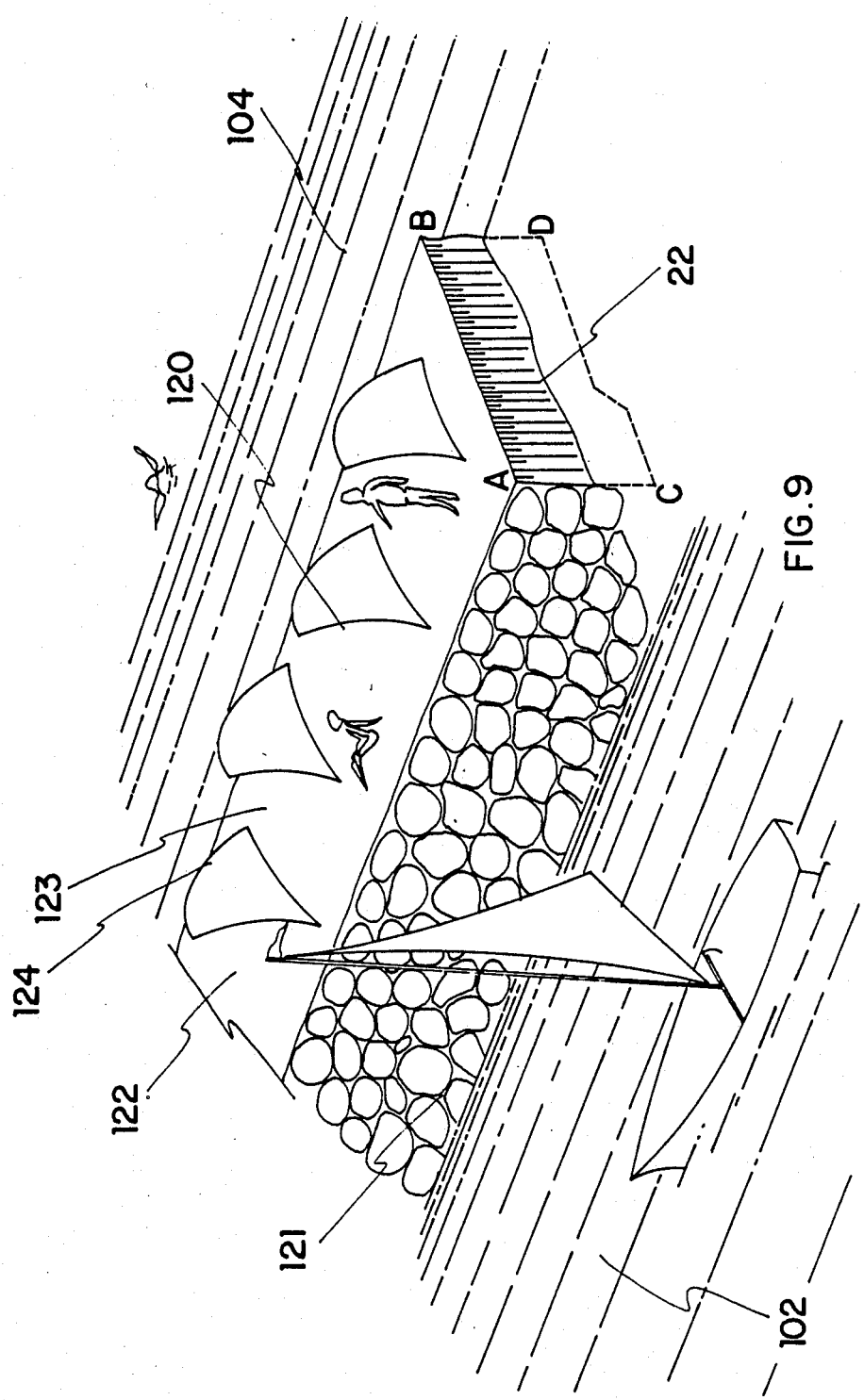
FIGS. 9, 10 and 11 are isometric, side elevational and top plan views, respectively, of a protection system for jetties according to the present invention and its environment.

FIG. 9 is a view of an energy-dissipating overflow-type protection system for jetties in accordance with the invention. Over a more or less conventional breakwater rests the platform 122 over which the water from the waves can run, the water's energy being broken up among the divergent channels, 123, composed of dispersion elements 120, connected firmly to the platform 122, or made independently. These elements have a crest 124 that cannot be overflowed by the average wave; provision has been made for the cross-section of the elements 120 to increase as one goes from the outer zone 102 to the inner zone 104, thereby preventing a major percussion wave by increasing the area of impact and increasing the time of impact.

The energy of the wave on the outside will be dissipated by the fundamental action of dissipation by projection and the friction and shock action generated by the hydrodynamice dispersion elements 120, and the formation of channels 123 between these elements, and the surface 122 can be used (when wave action permits) for walking, sitting, as a solarium, etc., constituting a functional element with a very interesting morphology within the appropriate integrated treatment of the ocean front, in other words, permitting maritime urban development.

Figure 10:
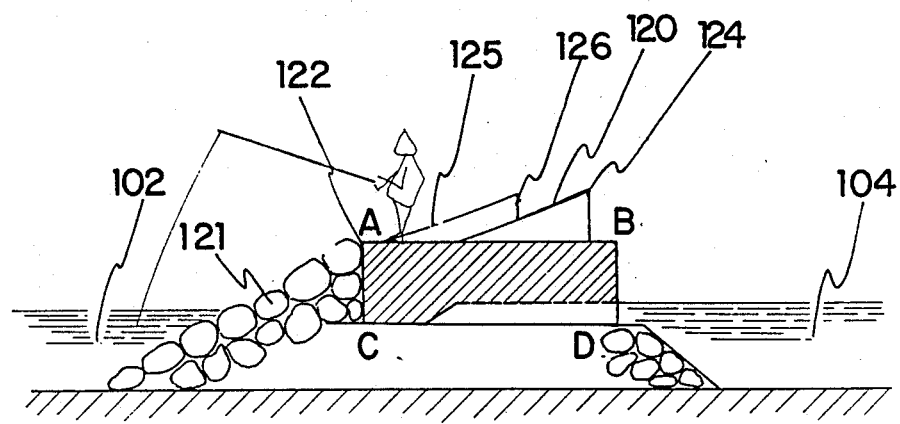

FIG. 10 represents a section of the foregoing perspective, with 102 and 104 representing the outer and inner zones of the system; visible on the platform 122 are the energy-dissipation elements 120, built in a hydrodynamic form with a section 125 that expands from the outer zone toward the inner zone, and finished ad hoc at the rear 126, seeking the desired optimum hydraulic conditions.

Figure 11:
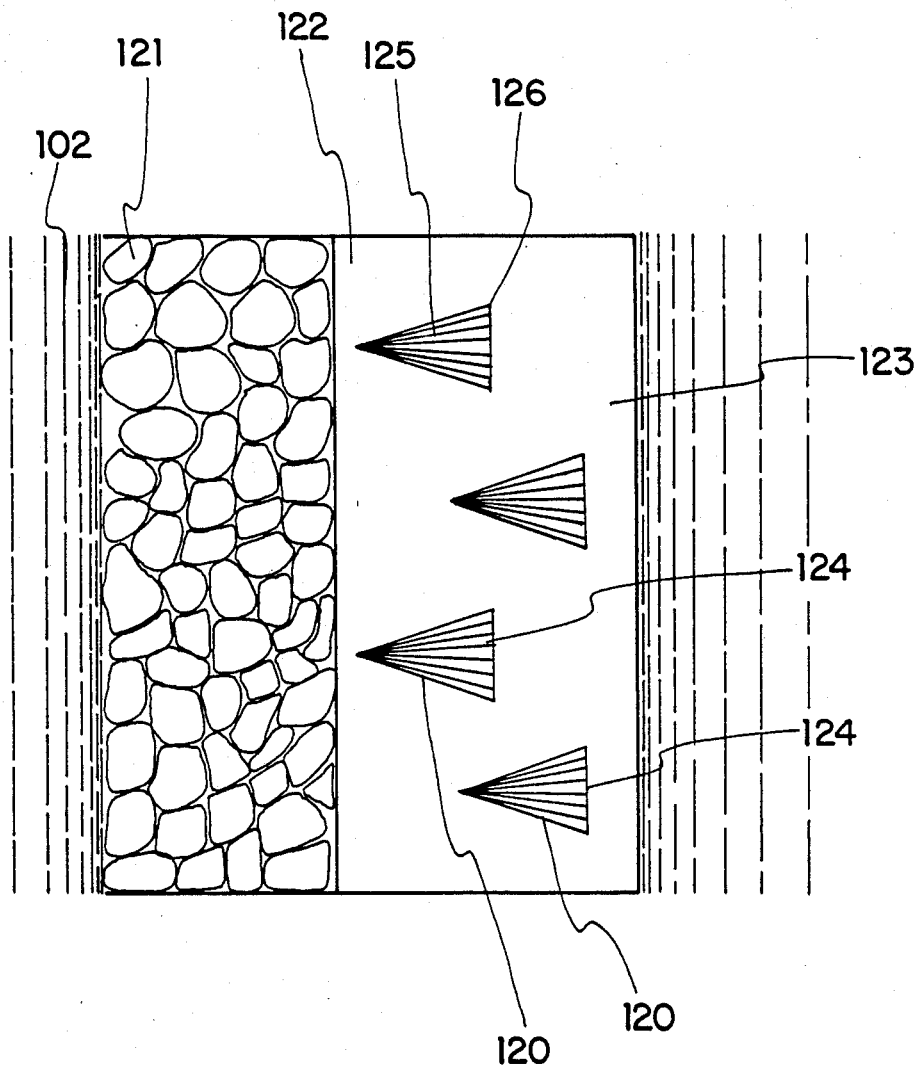

FIG. 11 is the ground plan of FIG. 9, where the riprap areas 121 on the outer zone 102, and the inner zone 104, can be used for recreation purposes, where the parts 120 on or built into the platform 122 feature a hydraulic design of increasing surface area 125, finished off by an adequate hydraulic section in the rear 126.

Figure 12:
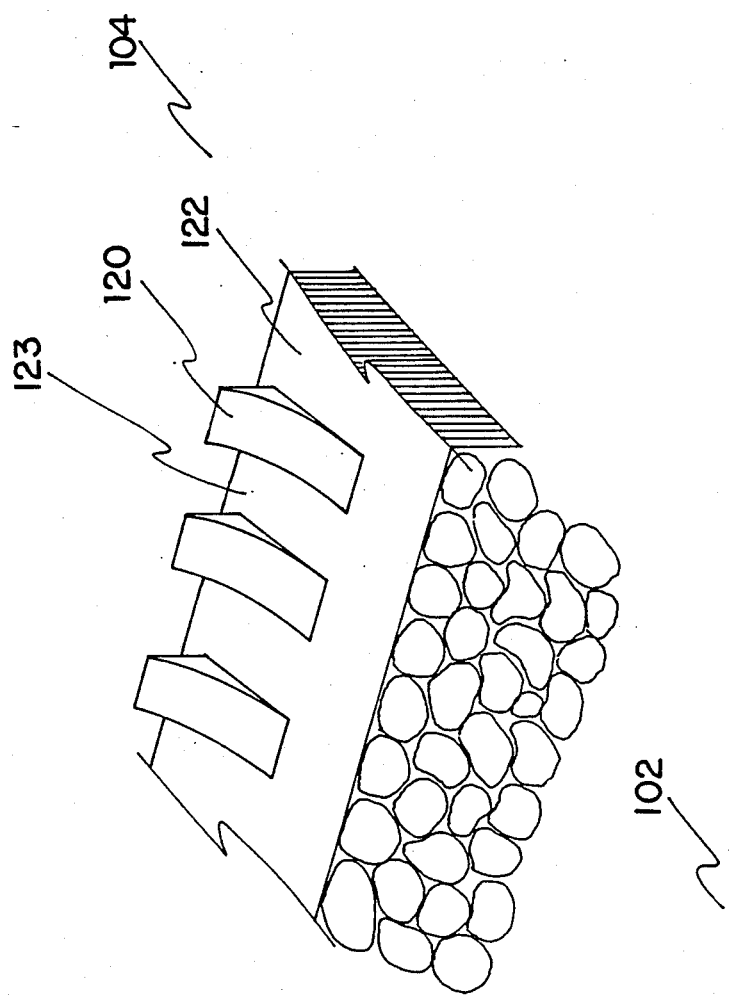
FIGS. 12-16 are isometric views of alternative embodiments of protection systems of the present invention.

FIG. 12 shows other elements according to the invention, consisting of cylindroid segments.

Figure 13:
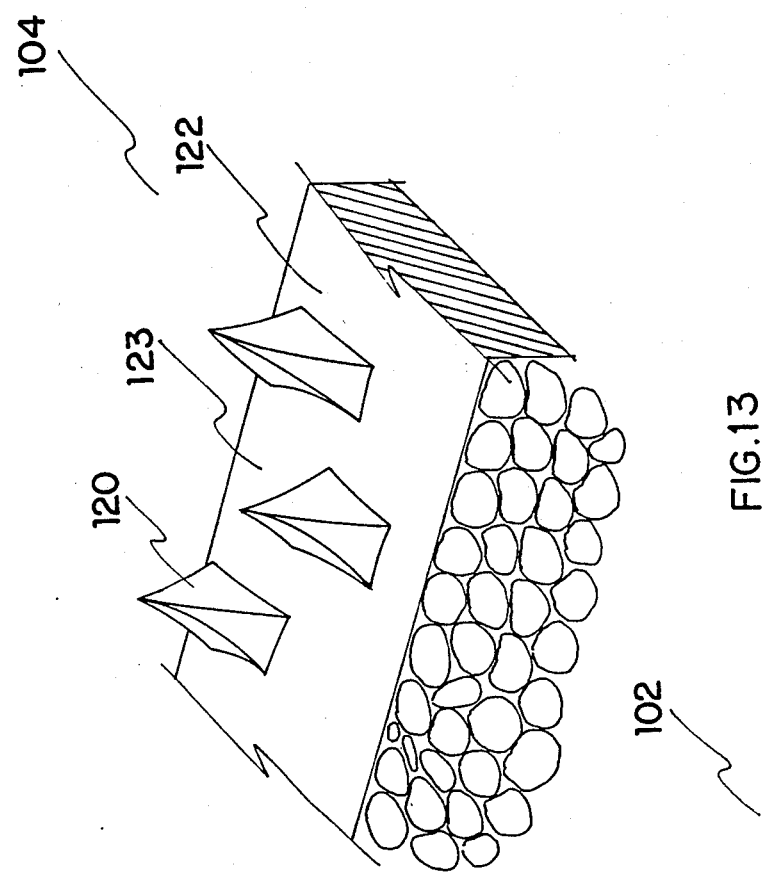

FIG. 13 shows elements consisting of conoid segments.

Figure 14:
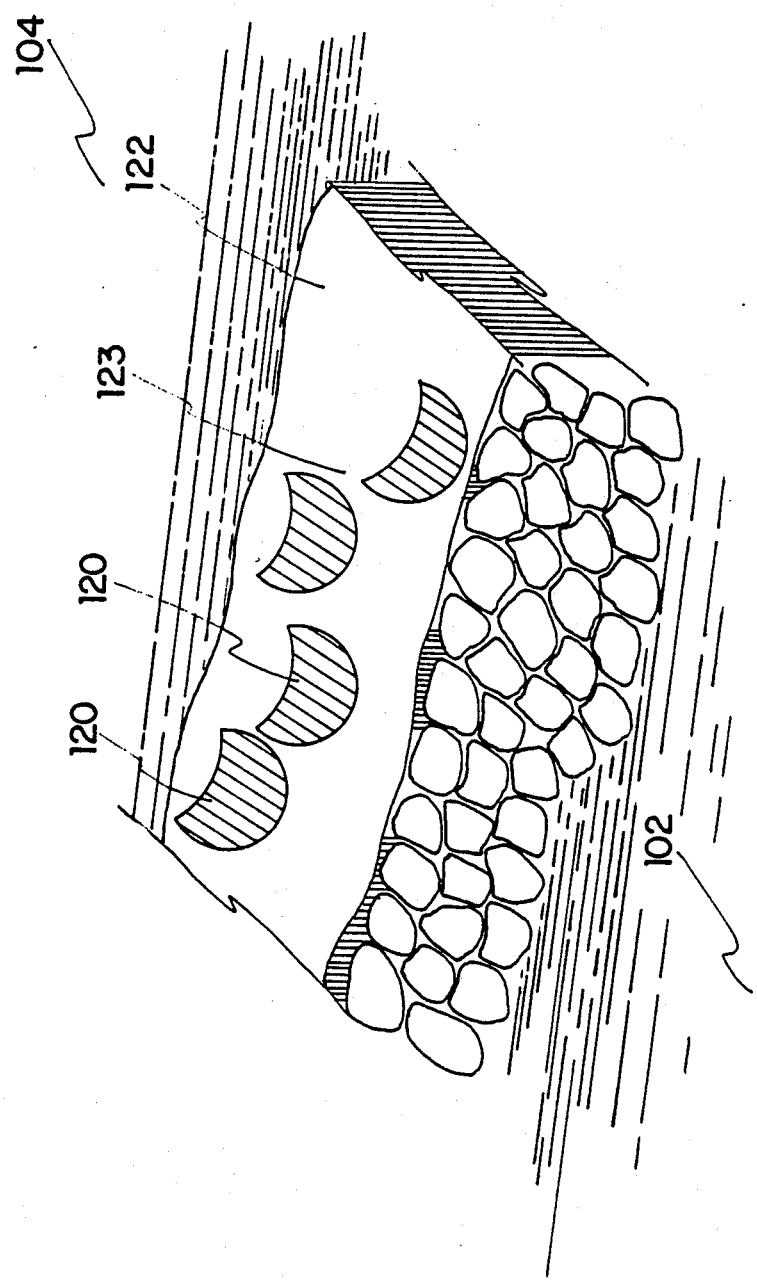

FIG. 14 shows elements made to resemble barchans.

Figure 15:
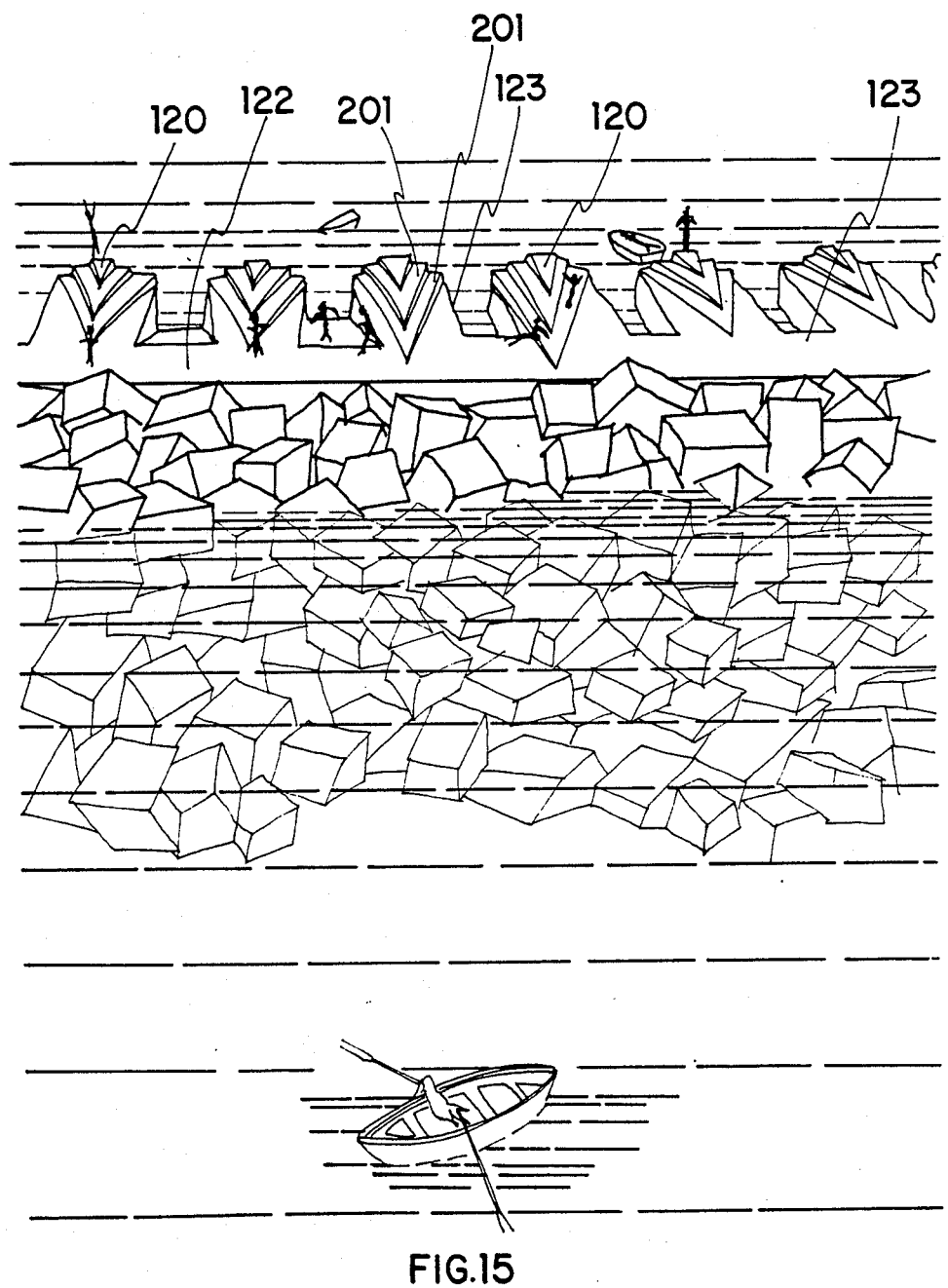
Figure 16:
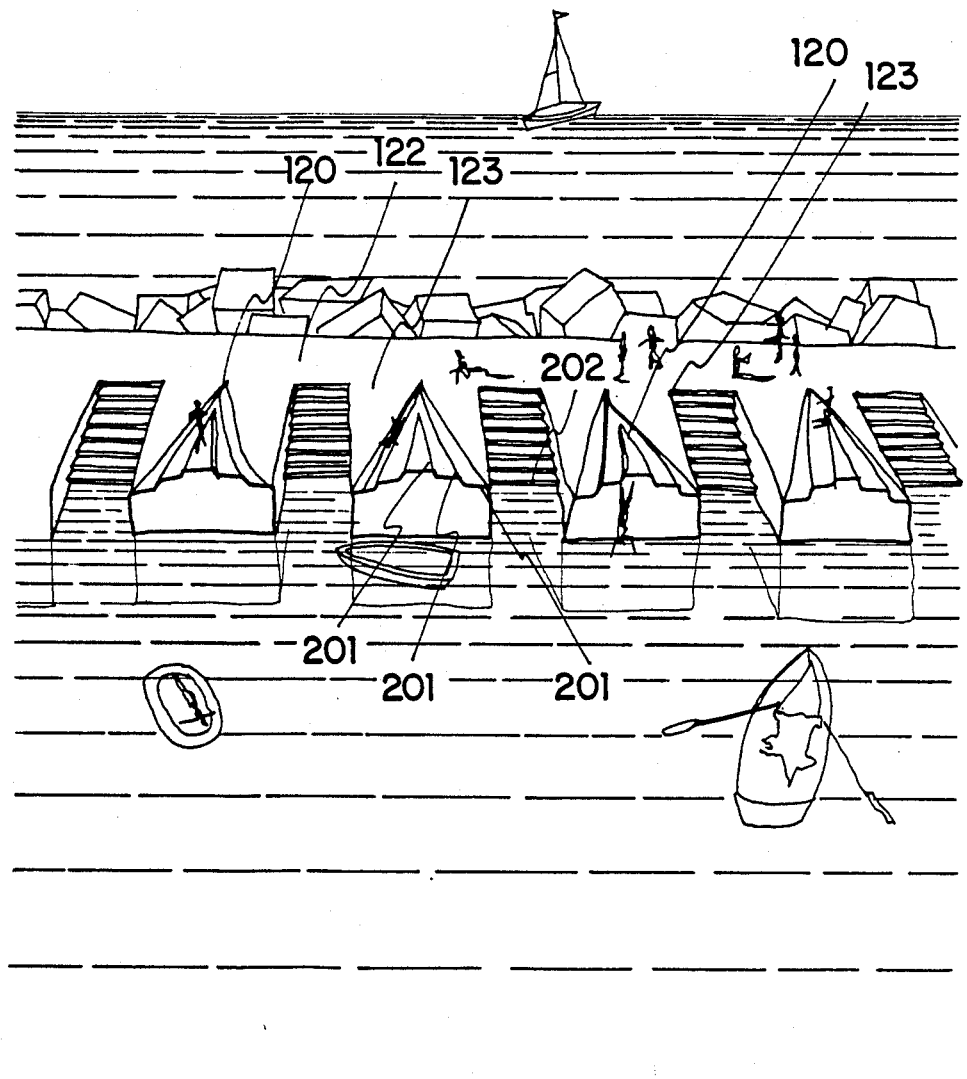

FIGS. 15 and 16 present an energy-dissipating overflow-type type protection system according to the invention. These figures show, atop a more or less harmonious breakwater, a platform 122 with divergence channels 123 between the dispersion elements 120, firmly connected to the platform 122. The dispersion elements 120 consist in this case of coinoids cut down to form steps 201.

In the divergence channel area, toward the tranquil area, accesses have been provided 202 to permit adequate use of these areas.

These figures show that the energy dissipators can be lined up, arranged in alteration or at random, possibly a combination of these layouts.

Energy-dissipating overflow-type systems make it possible to simulate natural landscape, such as those produced by the wind (barchans) or other geomorphological agents.

The platforms of energy-dissipating overflow-type systems can be flat, warped, mosaic-stepped, etc., and they can have a regular or irregular contour. In certain cases, the platform itself is configured as an energy-dissipating element or elements, and can even simulate natural landscapes: granite domes, sedimentary escarpments, reefs, etc.

The infrastructure of any of the alternatives in FIGS. (9) to (14), and of any other that may be designed, can consist of caissons, prefabricated elements or elements built "in situ", with vertical or nearly-vertical faces, the crest of which constitutes the energy-dissipating overflow-type system.

The infrastructure of any of the alternatives in FIGS. (9) through (14), and of any other that may be designed, may also be formed of a core of loose materials shielded by the corresponding strata of sloped riprap, FIGS. (9) to (14), with the crest of these strata constituting the energy-dissipating overflow system.

On shores exposed to large waves, such as "SEICHES", "TSUNAMIS", which are frequent in Japan and Hawaii, and "STORM SURGES", which are very frequent in the Gulf of Mexico, the use of this system is very advantageous for the structure itself, since it remains submerged and less affected than conventional dikes and jetties by the passage of these large waves.

I claim:

1. An energy-dissipating overflow-type dike spaced from shore and dividing a body of water into inner and outer zones, comprising:
    (a) an overflow-type dike defining on its upper surface a platform having an average elevation approximating the mean surface of the body of water;
    (b) a plurality of upstanding wave energy-dissipating elements closed to passage of water therethrough, each of varying horizontal cross-sectional width, disposed in spaced relationship on said platform to reduce the potential impact effect of a water overflow on the inner zone by extending the area and period of impact; and
    (c) a plurality of channels, each of varying horizontal cross-sectional width, defined by and between said elements for dissipating the kinetic energy of water passing therethrough while enabling water flow for basin water renewal in the inner zone.

2. The dike of claim 1 wherein said platform has an average elevation spaced slightly above the mean surface of the body of water.

3. The dike of claim 1 wherein said platform has an average elevation spaced slightly below the mean surface of the body of water.

4. The dike of claim 1 wherein said elements are in the shape of revolved geometric figures.

5. The dike of claim 1 wherein each of said elements has a horizontal cross-sectional width which increases generally as the element progresses from the outer zone toward the inner zone.

* * * * *